UNITED STATES PATENT OFFICE.

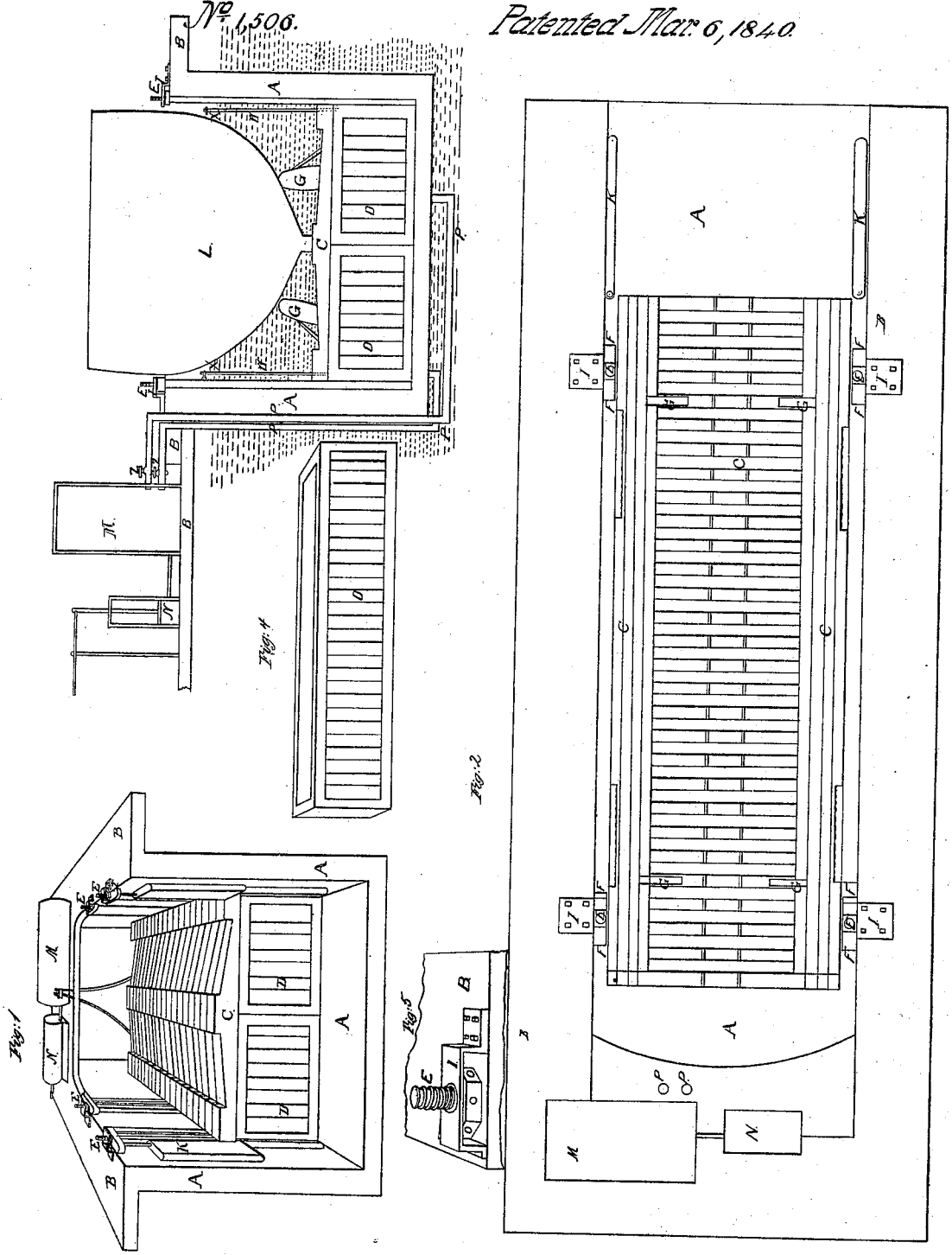

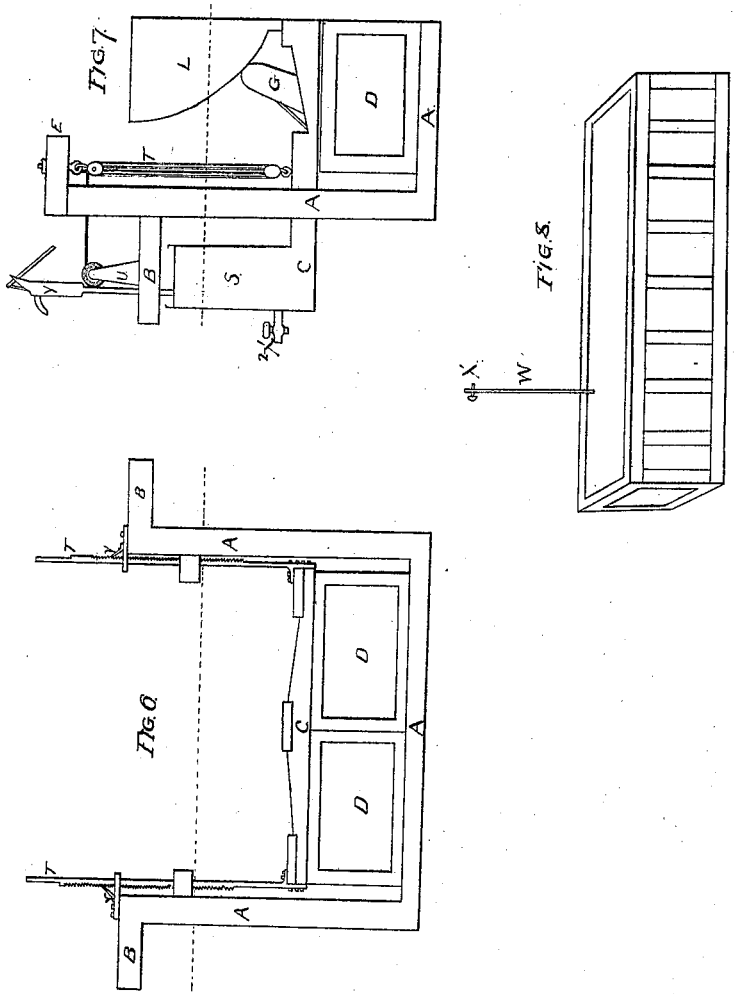

CHARLES F. JOHNSON, OF TIOGA, NEW YORK.

DRY-DOCK.

Specification of Letters Patent No. 1,506, dated March 6, 1840.

*To all whom it may concern:*

Be it known that I, CHARLES F. JOHNSON, of the town and county of Tioga, State of New York, have invented a new and useful Improvement in Dry-Docks; and I do hereby declare that the following is a full and exact description thereof.

It is called the pneumatic lifting dock.

The nature of it consists in placing inverted boxes or air chests beneath a cradle for receiving the vessel and giving them buoyancy by forcing air into or under them.

To enable others skilled in the art to make and use my invention, I proceed to describe its construction and operation.

A basin or slip being provided of suitable dimensions a cradle is placed in it formed by connecting together timbers placed parallel to each other by means of other timbers across them. Chucks in the usual form are placed on them for the purpose of maintaining the vessel in an upright position when raised. Near each of the four corners of the cradle a screw (E Figures 1 and 2) is placed connected with the cradle timbers, passing perpendicularly up through timbers projecting from the sides of the piers above high water mark. Nuts are placed upon these screws and are brought down to the projecting timbers. A clamp is placed over the nuts and attached to the projecting timber as seen in Fig. 5. The object of these screws and nuts is to maintain the cradle in a horizontal position and for the purpose of controlling it when rising or falling by turning the nuts.

In place of these screws iron bars (T Fig. 6) may be substituted with notches. These are attached to the cradle timbers and pass perpendicularly up through a projecting timber, where there is a hand or ratchet (V, Fig. 6) to hold it. Or a tackle may be substituted for the screws as seen in Fig. 7 T attached to the cradle timbers and to a projecting timber (E) a sufficient distance above the platform B or top of the pier, with a windlass U upon the pier, by working which the cradle may be raised or let down and kept level while rising.

In situations where it is desirable to have a floating dock, four or more water-tight boxes open at the top say four or five feet wide and of length according to the dimensions or about one half of the dock, sufficiently high that their upper edges may be above water when the cradle is lowered, may be placed and secured upon the outer ends of the cradle timbers. These boxes (S Fig. 7) have pipes near the bottom furnished with stop cocks $X^2$, by which water may be admitted into them, and a common lifting pump Y, by which it may be discharged. In raising a vessel the water is first to be pumped out of these boxes, and their buoyancy will serve to keep the cradle level while rising by subsequent operations. Under the cradle thus formed and connected with it are placed four or more inverted boxes or air chests side to side and end to end about five feet deep and of sufficient size to occupy nearly the whole area of the cradle. One of these boxes is shown separately Fig. 4 with the open side turned up. They are made air or water tight, and may be constructed of timber and plank, but the best material is boiler iron. A metallic pipe about one inch in diameter (see Fig. 3 " W " and Fig. 8 " W ") which extends above water and is furnished with a stop cock X at its upper end is inserted air tight through the top of the boxes.

A forcing pump or blowing cylinder (N Fig. 3) is placed upon the pier or bulk head, communicating with an air tight receiver, which is furnished with four metallic pipes (two only of which are represented P, P,) with stop cocks Z Z, near the receiver. These pipes are led one under each of the air chests, or their end opens under the air chest, or the pipes may proceed directly from the pump and have stop cocks in them.

The mode of operation is as follows: The cradle being ballasted so as to sink in the water, it is let down by turning the nuts on the screws or otherwise, till the vessel to be raised can be floated over it and secured in its position on the reel blocks in the usual way. The forcing pump is then put in operation and air forced into the receiver; and the cocks in the pipes P being turned it passes through them and rises into the boxes or air chests, gives them buoyancy. The nut on the screws being turned meantime regularly so as to allow the cradle to rise evenly and bear up the vessel. In order to let the vessel down again, the cocks X in the pipes W, Fig. 3, are opened and the air is suffered to escape from the air chests; the nuts on the screws E being turned at the same time regularly so as to allow the cradle to settle evenly into the water.

*Description of the drawings accompanying*

*this specification and forming part of the same.*—Fig. 1, a perspective view of the dock and cradle seen from the entrance; Fig. 2, plan of the dock and platform around it and the cradle within it, under which are the air chests; Fig. 3, transverse section of the basin cradle and vessel; Fig. 4, one of the boxes or air chests seen in perspective with the open side turned up; Fig. 5, a portion of one of the screws with nut and clamp. Plate II: Fig. 6, transverse section showing the bars T which may be substituted for the screws; Fig. 7, section of half of the dock showing a method of keeping the cradle level by means of a tackle; Figs. 6 and 7 also show the boxes placed upon the outer ends of the cradle timbers. Fig. 8 one of the air chests showing the pipe W which reaches above the water with the stop cock X for drawing off the air from the air chest.

A is the basin, here represented as of wood; B, the platform, C, the cradle; D, the boxes or air chests; E, the four screws; F, timbers standing perpendicularly each side of the screws; G, the chucks; I, the clamps inclosing the nut; K, doors at the inlet of the basin; L, the ship; M, the reservoir; N, the air pump; P, the pipes leading from the reservoir under the boxes; S, the boxes on the ends of the cradle timbers; T, the upright bars which may be substituted for the screws; U, a windlass connected with the tackle; V, hands or claws to hold the bars when raised; W, pipe extending above the water by which the air is drawn off from the boxes by the cock X; X, cock in the pipe reaching from the box above water; Y, the pump by which the water is discharged from the box S; Z, stop cocks in the pipes leading from the reservoir; $X^2$, stop cocks by which the water is admitted to the box S.

Instead of making the cradle as above described all in one it may be made in four or more sections or parts having two or more air chests with their fixtures under each, with a screw or other fixture as described at each of the four corners of each section.

What I claim as my invention and desire to secure by Letters Patent is—

The application of screws, bars, pulleys, or other suitable fixture as above described for preserving the equilibrium of the cradle and vessel while rising by the buoyancy of air; but I do not claim the principle of raising vessels by the buoyancy of air.

Given under my hand this 30th day of July eighteen hundred and thirty nine.

CHAS. F. JOHNSON.

Witnesses:
 JEDEDIAH FAY,
 I. RIPLEY.